(12) United States Patent  (10) Patent No.: US 8,071,047 B2
Krishnamurthy  (45) Date of Patent: Dec. 6, 2011

(54) CENTERPIPE DESIGN FOR RADIAL FLOW REACTOR

(75) Inventor: Sujay R. Krishnamurthy, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 249 days.

(21) Appl. No.: 12/622,791

(22) Filed: Nov. 20, 2009

(65) Prior Publication Data

US 2011/0123412 A1 May 26, 2011

(51) Int. Cl.
 *B01J 8/12* (2006.01)
(52) U.S. Cl. ........ 422/311; 422/213; 422/216; 422/219; 422/220; 422/221; 422/239
(58) Field of Classification Search .................. 422/311, 422/213, 216, 219, 220, 221, 239
See application file for complete search history.

(56) References Cited

U.S. PATENT DOCUMENTS

| 1,858,592 | A | * | 5/1932 | Johnson | 166/231 |
| 4,276,265 | A | * | 6/1981 | Gillespie | 422/311 |
| 5,190,161 | A | * | 3/1993 | Arai | 209/400 |
| 6,224,838 | B1 | | 5/2001 | Schulz et al. | |
| 7,621,988 | B1 | * | 11/2009 | Sun et al. | 96/152 |
| 2008/0219898 | A1 | * | 9/2008 | Gregor et al. | 422/129 |
| 2009/0142240 | A1 | * | 6/2009 | Vetter et al. | 422/211 |

* cited by examiner

*Primary Examiner* — Walter D Griffin
*Assistant Examiner* — Huy-Tram Nguyen
(74) *Attorney, Agent, or Firm* — Arthur E. Gooding

(57) ABSTRACT

A device is presented for use as a centerpipe in a radial flow reactor, or for a radial flow adsorption bed. The device includes a plurality of stacked slotted cylindrical sections and frustums. The design retains the particles in a solid particulate bed that can be flowing through the reactor. The frustums provide covers to the cylindrical sections to prevent the flow of solid particles back through the slots in the cylindrical sections.

19 Claims, 2 Drawing Sheets

SECTION A-A

CENTERPIPE DESIGN FOR RADIAL FLOW REACTOR

FIELD OF THE INVENTION

This invention relates to the field of fluid particle contact and to an apparatus for contacting fluids and particles. More specifically, this invention relates to a containment system for a moving bed of particles with a cross-flowing fluid.

BACKGROUND OF THE INVENTION

A wide variety of processes use cross flow reactors to provide for contact between a fluid and a solid. The solid usually comprises a catalytic material on which the fluid reacts to form a product. The processes cover a range of processes, including hydrocarbon conversion, gas treatment, and adsorption for separation.

Cross flow reactors are often radial flow reactors and are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes are used to hold the catalyst particles within a bed and are sized to have openings sufficiently small that the particles cannot pass through. The openings may be elongated slots having a sufficiently narrow spacing such that the particles cannot pass through the slots. An example of a screen design for a cross flow reactor can be found in U.S. Patent No. 6,224,838, showing the design of conduits, having a scallop shape for cross flow that allows a catalyst or adsorbent to flow downward through the reactor. A significant problem is the corrosion of meshes or screens used to hold catalyst beds in place, or for the distribution of reactants through a reactor bed. Corrosion can plug openings to a screen or mesh, creating dead volumes where fluid does not flow. Corrosion and erosion can also create larger openings where the catalyst particles can then flow out of the catalyst bed with the fluid and be lost to the process increasing costs. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

SUMMARY OF THE INVENTION

The present invention provides for an apparatus for containing a particulate solid material within a cross flow reactor. The apparatus includes a stacking of conically shaped frustums to form a centerpipe having openings to allow fluid to flow through the centerpipe to a catalyst bed flowing outside the centerpipe. The frustums each have an upper edge and a lower edge, wherein the lower edge extends into the catalyst bed relative to the upper edge. A gap is created underneath the frustums for the flow of fluid. The frustums are affixed to a plurality of stiffeners that are arrayed circumferentially around the inside of the device. The stiffeners hold the frustums in place, and provide support.

In one embodiment, the device includes a plurality of cylindrical sections, where each cylindrical section is in an alternating arrangement with the frustums. The cylindrical sections allow for controlling the designed amount of open area for fluid flow, and to design for a desired pressure drop to insure a good distribution of fluid along the device. When the cylindrical sections and the frustums are stacked, they form a cylindrical section-frustum pair, where the upper edge of the frustum is proximate to the upper edge of the cylindrical section, and where the frustum lower edge extends to below the lower edge of the cylindrical section. The cylindrical section provides for horizontal slots for the flow of fluid interior to the centerpipe out to the bed.

In another embodiment, the surface of the frustum forms an angle between 5 and 20 degrees, relative to the centerline of the centerpipe.

Other objects, advantages and applications of the present invention will become apparent to those skilled in the art from the following detailed description and drawings.

DETAILED DESCRIPTION OF THE INVENTION

Figure 1:
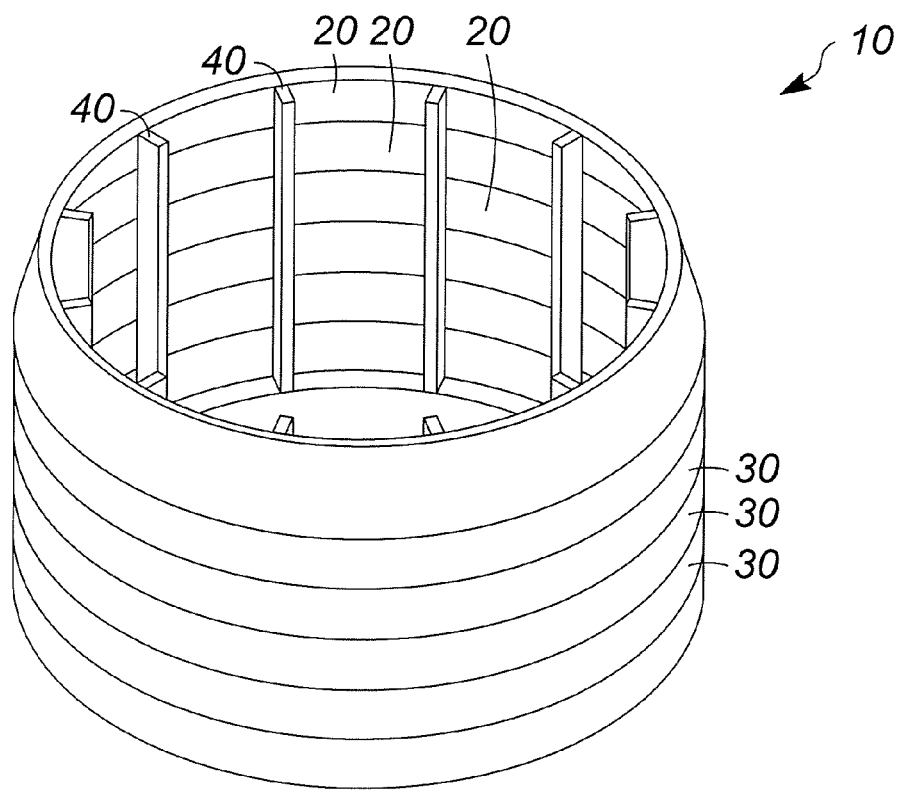
FIG. 1 is a perspective view of the device.

A problem exists with radial flow reactors where a catalyst flows down an annular region, and the annular region is defined by an inner screened partition and an outer screened partition, which defines the catalyst bed, or a particle retention volume for holding a granular solid. A fluid, usually a gas, flows across the partitions and catalyst bed, reacting with the catalyst to produce a product fluid, also usually a gas. The reactor holds the catalyst in with screens where the gas flows through. The screens need holes, or slots, sufficiently small, or narrow, to prevent catalyst particles from passing, but the holes are subject to plugging and creating dead spaces where the gas doesn't flow, as well as the screens are subject to erosion and corrosion, creating larger holes that allow for catalyst to spill out. In addition to mechanical problems associated with screens, one problem is the jetting of the fluid into the reactor bed. The jetting causes particle attrition, and maldistributes the fluid in the region proximate to the screen.

The current design for a dehydrogenation reactor, and in particular a propane dehydrogenation reactor, uses a perforated channel rod at the outer diameter of the bed in order to ensure uniform flow distribution. However, CFD models have shown that this does not guarantee uniform inlet distribution. This invention aims to provide a centerpipe design that provides pressure drop to improve flow distribution into the bed inlet, while mitigating jetting concerns.

The apparatus can also be an adsorber for adsorbing a constituent from the fluid flowing over a granular solid adsorbent. This includes an apparatus where the adsorbent is loaded and does not flow through the adsorber, but is held in place by the inlet and outlet partitions while fluid flows over the granular adsorbent. The apparatus of the present invention is oriented for the downward, or in the direction of gravity, flow of a solid through the apparatus with the cross flow of a gas, and accordingly, the use of the terms downward and upward are in reference to directions relative to the direction of gravity.

A new design for a screenless reactor, using conically shaped frustums that are stacked in the center of a reactor to form a centerpipe with openings, provides the ability to contain the catalyst while allowing cross flow of a fluid and in addition reducing or eliminating fouling or plugging in the reactor. This stacked frustum design has a free surface of catalyst that allows for vapor flow to enter a catalyst bed and contact the catalyst, and a large open area that mitigates plugging or fouling issues associated with screens. The new design removes the jetting problem, and provides for a uniform distribution of fluid over the catalyst underneath the frustums, providing a well distributed flow in the circumferential direction.

The present invention is a device for use as a slotted centerpipe in a reactor, or adsorber. The device comprises a plurality of conically shaped frustums in a stacked arrangement and connected to a plurality of vertical stiffeners. The vertical stiffeners are arrayed circumferentially around the device and each stiffener is affixed to the upper edge of all of the frustums. The means of affixing the stiffeners to the frustums are well known in the art, and include welding, and mechanical attachments such as rivets or bolts. The frustums are stacked in a vertical orientation and have a common centerline, and each frustum has an upper edge and a lower edge, where the upper edge has a smaller diameter than the lower edge. The purpose of the design is to distribute the flow of the fluid over the surface of the catalyst underneath the frustums, while preventing jetting problems associated with holes in normal screens.

A frustum as is a conically shaped, or pyramidally figure lying between two substantially parallel planes. The frustum can also be seen as a cylindrically shaped figure having a changing diameter as one travels along the center axis of the frustum. In particular, the frustum can be seen as a flaring cylindrically shaped section. For purposes of this invention, a frustum is a conical section, or a pyramidally shaped figure comprising more than sic sides, having the top of the cone cut off, leaving a cylindrical, or toroidal, section having a smaller diameter at the top of the frustum and a larger diameter at the bottom of the frustum.

Each frustum comprises a cylindrically, or toroidally, shaped solid wall having an upper diameter defining the top of the cylindrically shaped wall, and a lower diameter defining the bottom of the cylindrically shaped wall. The lower diameter of each frustum is greater than the upper diameter of the frustum. The frustum wall extends away from the centerline at an angle between 5 and 80 degrees relative to the centerline. Preferably the frustum wall extends at an angle between 5 and 20 degrees relative to the centerline, and more preferably at an angle between 10 and 20 degrees. In one embodiment, all of the frustums have substantially the same upper diameter, and substantially the same lower diameter.

The frustums are stacked in a manner such that the lower edge of a frustum extends below the upper edge of the neighboring frustum disposed beneath the frustum. This provides a space to prevent the back flow of solid particles into the centerpipe. For stability, the frustums may include frustum connectors, wherein the connectors maintain a fixed spacing between neighboring frustums. The connectors have a first end affixed to the lower edge of a first frustum, and a second end affixed to a neighboring frustum disposed directly beneath the first frustum, and where the second end is affixed to a position between the upper edge and the lower edge of the neighboring frustum. Preferably the second end is affixed at a position between 30% and 70% of the distance between the upper edge and lower edge of the neighboring frustum below the first frustum.

The frustums are stacked and spaced to provide a total open space between neighboring frustums from 2 to 20% of the total surface area of the centerpipe. The open space is for flow of the fluid in the reactor, and for controlling the distribution of the flow in the reactor. The open space between the stacked frustums provides a horizontal distribution of the fluid to distribute the flow over the catalyst under the frustums, and to prevent problems associated with jetting of the fluid. The device can further include a plurality of cylindrical sections, where each cylindrical section is placed between neighboring frustums. The cylindrical sections have openings comprising between 2 and 20% of the surface area of the cylindrical sections. For setting the pressure drop to control flow distribution over the length of the centerpipe, the cylindrical sections will have openings preferably comprising between 2 and 5% of the total area of the cylinders.

Inducing a pressure drop in the centerpipe provides for a substantially uniform flow distribution across the open areas in the wall of the centerpipe. The open areas should be on the order of 2%, but can be larger depending on the flow conditions and the fluid properties. One concern with standard centerpipe construction is the jetting of fluid through circular holes in the centerpipe. This invention uses horizontal slots in the centerpipe, or larger openings between neighboring conical sections forming the centerpipe to reduce jetting problems. The slots can be in cylindrical sections and can be of varying size as one moves down the centerpipe. The fluid flows through the slots and is distributed under the conical sections, or frustums that make up the centerpipe. The flow is redirected downward into the bed of solid catalyst. Preferably, the slots in the cylindrical sections are elongated, horizontal slots that allow for substantially uniform circumferential flow. The flow is into the region underneath the frustums, and is subsequently further made uniform in the circumferential direction.

Figure 2:
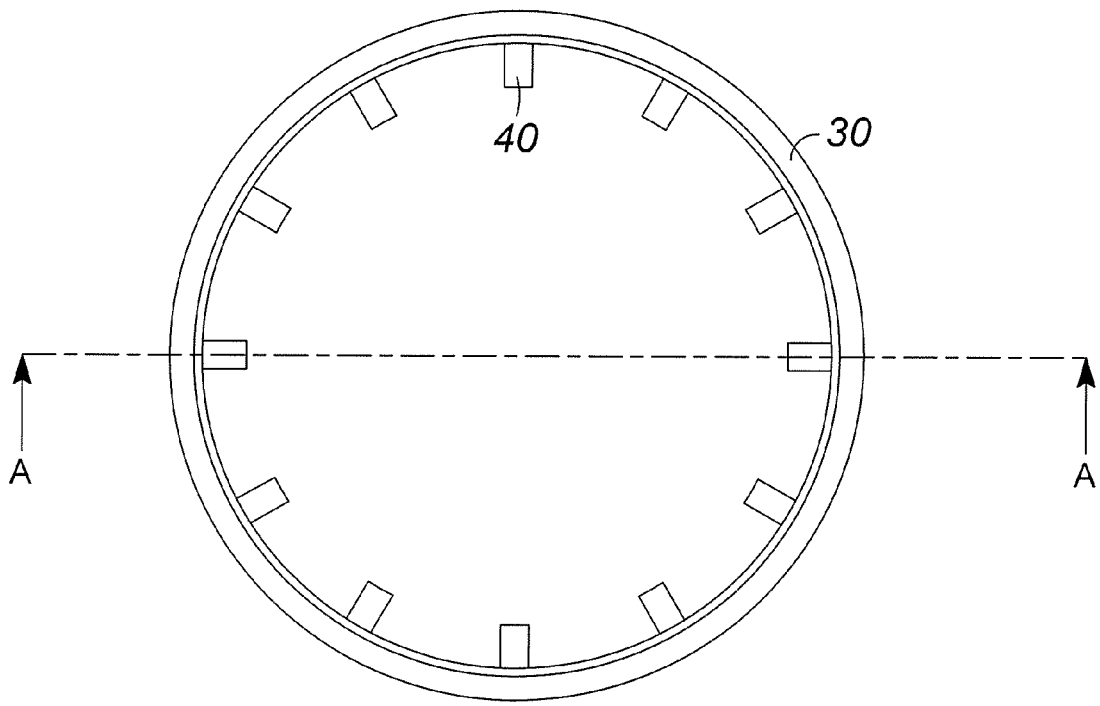
FIG. 2 is a horizontal cross-sectional view of the device.

One embodiment of the present invention is a device as shown in FIG. 1. The device 10 comprises a plurality of cylindrical sections 20 in a stacked orientation, where each cylindrical section 20 has an upper edge, a lower edge and cylindrical diameter. The wall of the cylindrical section 20 has openings distributed over the wall to allow fluid to pass through the cylindrical sections 20. The device 10 further includes a plurality of conically shaped frustums 30, wherein each frustum has an upper edge with an upper diameter and a lower edge with a lower diameter, and where the lower diameter is greater than the upper diameter, and where the upper diameter is substantially equal to the cylindrical diameter. The device 10 includes a plurality of stiffeners 40 for supporting the cylindrical sections 20 and the frustums 30. The stiffeners 40 are arrayed circumferentially around the inside of the device 10, as shown in FIG. 2. There are at least 4 stiffeners used in the device 10 and the number can be between 4 and 40, with a preferred number of stiffeners 40 between 10 and 20. The frustums 30 form an angle with the centerline between 5 and 20 degrees.

Figure 3:
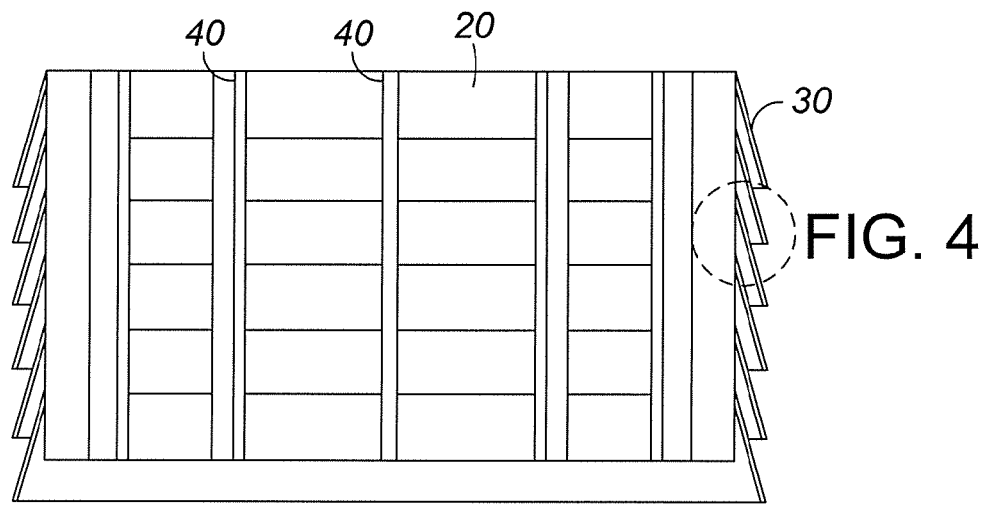
FIG. 3 is a vertical cross-section of the device, with the cut shown from FIG. 2.

The cylindrical sections 20 and the frustums 30 are stacked in an alternating manner as shown in FIG. 3, where each frustum 30 covers a cylindrical section 20 forming a cylindrical section-frustum pair. The cylindrical sections can have elongated, horizontally oriented slots, that extend the distance between vertical stiffeners. With each pair, the upper edge of the frustum 30 is disposed near or above the upper edge of the cylindrical section 20, and the lower edge of the frustum 30 extends to at least the lower edge of the cylindrical section 20, and preferably below the lower edge of the cylindrical section 20. The cylindrical sections 20 have openings defined therein for the flow of fluid through the cylindrical sections 20. The openings preferably are horizontally oriented slots, and provide an open area between 2 and 20% of the total area of the cylindrical section surface areas. To control the pressure drop, and to provide a relatively uniform distribution of flow across the cylindrical surface areas, the total open area is preferably between 2 and 5% of the total surface area. In addition, to further provide control of the flow distribution, the cylindrical sections 20 can have differing amounts of open area on each section. The slots in the cylindrical sections 20 preferably are disposed near the upper edge of the cylindrical sections.

Figure 4:
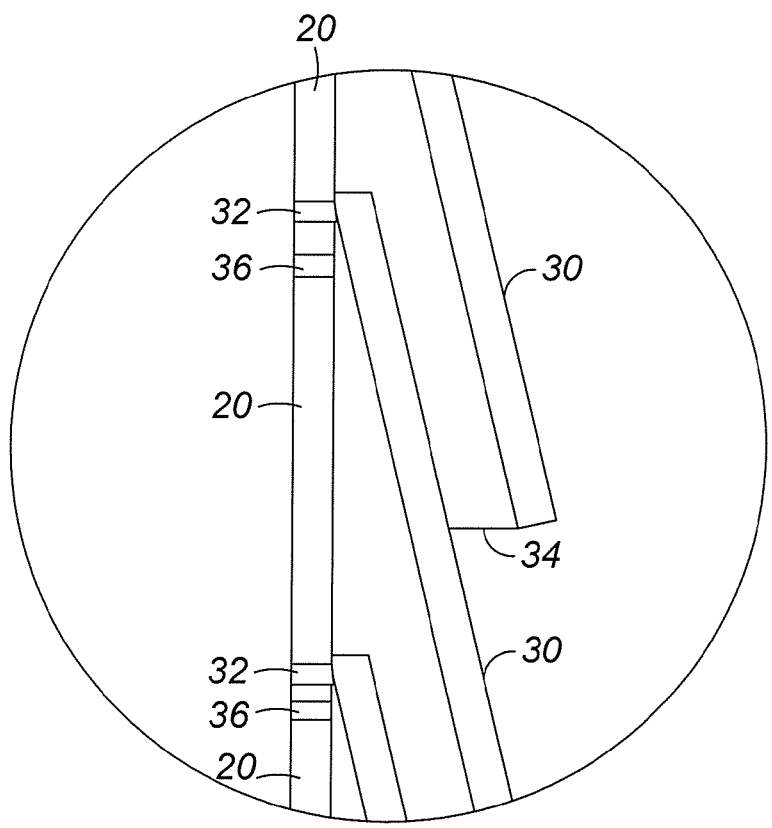
FIG. 4 is a enlarged view of a section, shown in FIG. 3, showing the orientation of the frustums and cylinders in the device.

An enlarged view of a section of the device 10 is shown in FIG. 4. The enlarged view shows the orientation of a frustum 30 and a cylindrical section 20. Each frustum 30 can include a protruding flange 32 affixed near the upper edge of the frustum 30, and extending inwardly on the device 10. The flange 32 has substantially the same diameter as the cylindrical section 20, and allows the frustum 30 to be stacked and supported by the cylindrical section 20. The vertical stiffeners 40 are affixed to the cylindrical sections 20 and the flange 32 of the frustums. Horizontal slots 36 are disposed within the cylindrical sections 20, and are preferably positioned toward the top of a cylindrical section 20.

The device 10 may also include a plurality of connectors 34, where each connector 34 extends from the bottom edge of a first frustum 30 to some position on a neighboring frustum 30 disposed beneath the first frustum. The connectors 34 maintain the spacing between neighboring frustums 30 and facilitate keeping the gap between neighboring frustums to a substantially constant value.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A device for use as a slotted centerpipe comprising:
a plurality of conically shaped frustums connected by a plurality of vertical stiffeners and the frustums are stacked in a vertical orientation and each frustum has a common centerline and each frustum has an upper and lower edge.

2. The device of claim 1 wherein each frustum comprises:
a cylindrically shaped solid wall having an upper diameter defining the top of the cylindrically shaped wall, and a lower diameter defining the bottom of the cylindrically shaped wall, wherein the lower diameter is greater than the upper diameter.

3. The device of claim 2 wherein all the frustums have substantially the same upper diameter and substantially the same lower diameter.

4. The device of claim 1 wherein each frustum is affixed to all of the vertical stiffeners, and wherein the stiffeners are arrayed circumferentially around each frustum.

5. The device of claim 1 wherein the plurality of conically shaped frustums are stacked in a vertical orientation, and in a manner such that the outer edge of a first frustum overlaps the inner edge of a second frustum that is disposed below the first frustum.

6. The device of claim 1 further comprising a plurality of frustum connectors, wherein the frustums are disposed in a vertical orientation and each frustum connector is affixed to the lower edge of an upper frustum and to a point between the upper and lower edge of a lower frustum.

7. The device of claim 6 wherein the frustum connector is connected to a point between 30% and 70% of the distance between the upper and lower edge of the lower frustum.

8. The device of claim 1 wherein each frustum has a wall that forms an angle between 5 and 80 degrees with the centerline.

9. The device of claim 8 wherein each frustum has a wall that forms an angle between 10 and 20 degrees with the centerline.

10. The device of claim 1 wherein the total open space between neighboring frustums is between 2 and 20% of the total surface area of the centerpipe.

11. The device of claim 1 further comprising a plurality of cylindrical sections, each section having the same diameter, and wherein the cylindrical sections are stacked, with the plurality of frustums affixed outside the cylindrical sections, and wherein the cylindrical sections have openings comprising between 2 and 20% of the surface area of the cylindrical sections.

12. A device for use as a slotted centerpipe comprising:
a plurality of cylindrical sections, wherein each cylindrical section has an upper edge, a lower edge, and a cylindrical diameter and the wall of the cylindrical section has openings distributed over the wall;
a plurality of conically shaped frustums, wherein each frustum has an upper edge with an upper diameter and a lower edge with a lower diameter, and wherein the lower diameter is greater than the upper diameter, and the upper diameter is substantially equal to the cylindrical diameter; and
a plurality of vertical stiffeners;
wherein the cylindrical sections and the frustums are stacked in an alternating manner and a vertical orientation, and wherein the vertical stiffeners are affixed to the cylindrical sections and the upper edge of the frustums.

13. The device of claim 12 wherein the frustums include a protruding flange with the flange extending toward the frustum centerline to provide the frustum with a means to hold the frustum in place above a cylindrical section.

14. The device of claim 12 wherein the lower edge of each frustum extends to below the lower edge of the cylindrical section adjacent and below the frustum.

15. A device for use as a slotted centerpipe comprising:
a plurality of cylindrical sections, wherein each cylindrical section has a cylindrical diameter and the wall of the cylindrical section has openings distributed over the wall;
a plurality of conically shaped frustums, wherein each frustum has an upper edge with an upper diameter and a lower edge with a lower diameter, and wherein the lower diameter is greater than the upper diameter, and the upper diameter is substantially equal to the cylindrical diameter;
a plurality of circular rings having a ring diameter substantially equal to the cylindrical diameter, wherein each circular ring is affixed to a conically shaped frustum along the upper edge of the frustum; and
a plurality of vertical stiffeners;
wherein the cylindrical sections and the frustums are stacked in an alternating manner and a vertical orientation, and wherein the vertical stiffeners are affixed to the cylindrical sections and the upper edge of the frustums.

16. The device of claim 15 wherein the cylindrical openings are horizontal slots.

17. The device of claim 15 wherein the openings are between 2% and 20% of the cylindrical surface area.

18. The device of claim 15 wherein the lower edge of each frustum extends to below the upper edge of the nearest frustum below said frustum.

19. The device of claim 15 wherein the wall of the frustum forms an angle with respect to the centerline of the frustum between 5 degrees and 20 degrees.

* * * * *